Aug. 4, 1936.                D. F. OTHMER                2,050,234
PROCESS FOR DEHYDRATION OF ACETIC ACID AND OTHER LOWER FATTY ACIDS
Filed July 13, 1934

Donald F. Othmer,
INVENTOR:
N. M. Perrins
Daniel J. Mayne
ATTORNEY.

Patented Aug. 4, 1936

2,050,234

UNITED STATES PATENT OFFICE 2,050,234

PROCESS FOR DEHYDRATION OF ACETIC ACID AND OTHER LOWER FATTY ACIDS

Donald F. Othmer, Brooklyn, N. Y., assignor to Tennessee Eastman Corporation, Kingsport, Tenn., a corporation of Virginia Application July 13, 1934, Serial No. 734,991

22 Claims. (Cl. 260—122)

This invention relates to a process for the concentration of aqueous solutions of the lower fatty acids, for example, acetic acid, the removal of the water therefrom, and the production thereby of concentrated acids to the point of substantially pure "glacial" acids.

Various solvent materials have been proposed for extracting acetic acid from its aqueous solutions by counter current liquid contact. The acetic acid after extraction may be more readily recovered from the solvent than from the water originally present. Still other methods have concerned themselves with the distillation of the aqueous solution in the presence of an auxiliary liquid, which by reason of its insolubility in water and the vapor pressure relations dependent thereupon, brings over the water in a low boiling vaporous mixture. In such methods (see for example, Othmer, U. S. Patent No. 1,917,391), it is usual practice to condense the vaporous mixture of water and withdrawing agent, separate the two layers of water and water insoluble third liquid respectively, discharge the water layer to waste (or to an auxiliary still for removing the trace of third liquid dissolved therein) and return the third liquid or withdrawing agent to the head of the column as reflux wash for the purpose of bringing over more water in a continuous operation.

I have found that certain materials of a somewhat different boiling range than those ordinarily used and exemplified by allyl acetate, boiling at 105° C., and dibutyl ether boiling at 141° C., are satisfactory materials to be used in the extraction process; in the azeotropic distillation process when the operation is changed slightly as will be noted hereinafter; or in the combined operation wherein, after systematic extraction of the aqueous acetic, the water dissolved with the acetic in the solvent layer is ejected in a so-called "azeotropic" distillation with the solvent itself. The use of low boiling materials such as ethylene dichloride and ethyl acetate is old in the art of removing water from acetic acid by these several practices; but these low boiling materials require an excessively large distillation column and considerable more heat because of the very high ratio of withdrawing agent to water in the azeotropic mixture.

It has been shown by the Dr. Wacker Gesellschaft in British Patent No. 298,137, that esters boiling at a higher temperature, such as butyl acetate, may be utilized to remove the water from acetic acid in an azeotropic distillation if a discontinuous process is used in which, after the water is removed, the butyl acetate is separated from the acetic acid by the addition of more water. This involved process, which requires careful analysis of the mixture of acid and ester remaining in the still pot in order to determine the amount of water to be added, is said to be suitable for use with acetic acid esters having a boiling range of 103–133° C., but those given as examples are confined to a boiling range between 118 and 143° C. On the contrary, allyl acetate, one of my preferred materials, boils at 105° C. Allyl acetate, it may be noted, is the acetic ester of an unsaturated alcohol, and while many processes (e. g. U. S. Patent No. 1,860,553) have involved esters of saturated alcohols, notably ethyl acetate, I have found this unsaturated ester to be particularly suitable.

The difficulty which has prevented the use of higher boiling materials such as esters for azeotropic withdrawing agents is their tendency to come out of the system with the acetic acid because their boiling points are so close to that of acetic acid that they cannot be satisfactorily separated therefrom by distillation and rectification. It is this difficulty that the involved, difficultly controlled and discontinuous process of British Patent No. 298,137 attempted to overcome.

I have found, however, that this tendency for the acetic acid to come out of the system contaminated by the higher boiling withdrawing agent may be readily overcome by the correct operation of the process as hereinafter explained in a continuous manner and in an efficient column of the usual type fitted with still pot or heating section, condenser and decanter as is usual practice in the use of azeotropic withdrawing materials. The type and arrangement of equipment is described in Othmer, United States Patent No. 1,917,391; but the method of operation is substantially different, as will be indicated.

The invention will be described with reference to the accompanying drawing in which—

Figs. 1, 2 and 3 are schematic, and comparatively show the process of the present invention as contrasted with processes in which the entrainers are respectively ethylene dichloride and propyl acetate.

In the drawing, Fig. 1 is a sectional elevation schematically showing the flow in a column of dilute acetic acid, ethylene dichloride entrainer and the extracted water.

Figure 1:
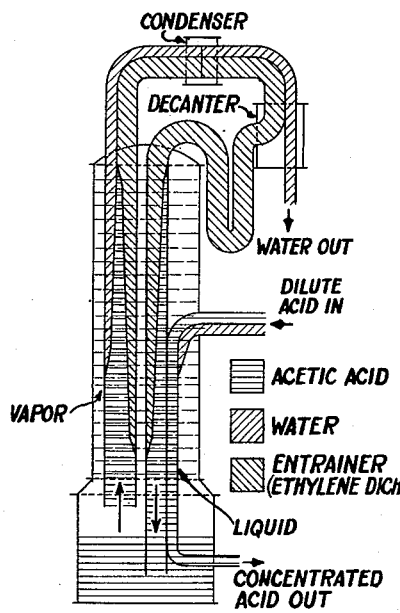

The efficient and almost complete separation of water and acid without the discharge of higher boiling withdrawing agent, such allyl acetate, in the acetic acid may be accomplished, by the control of the amount of the withdrawing agent in the system so that it is only in the upper part of the column; and considerable water is present in the acid below the lowest point where the withdrawing agent reaches. Heretofore, it has been thought necessary either to have an excess of withdrawing agent in the column so that it will exist in the column below that point where the last of the water has disappeared; or, at the least, approximately the right amount so that in working down the column, the last of the water and the last of the withdrawing agent will be vaporized together and hence removed from the acetic acid. This nice balance of just the correct ratio is, of course, difficult to control; and I have found it to be unnecessary; and that, by removing a part of the quantity of withdrawing agent which heretofore has been thought necessary to have present in the column, the acid may be discharged free of the higher boiling withdrawing agent.

By such operation it will be seen that liquid passing down the column will flow out of the section in which there is azeotropic withdrawing agent, still containing more or less water. Heretofore, such operation of the distilling column has been considered fatal to the removal of the last of the water to give the anhydrous acid which is desired at the base. I have discovered however, that it is possible to obtain substantially dry acid at the base even though considerable water flows down with the acid out of that section which is charged with the azeotropic withdrawing agent. I explain this ability to accomplish the hydration in a column, which according to previous practice would be regarded as insufficiently charged with withdrawing agent, on the ground that the fraction of water present is removed from the acid in the lower part of the column by the ordinary rectification process; and this water, containing considerable acid, is passed up into the azeotropic distillation range in which the water is separated from substantially all of the accompanying acid. In the usual case, it is not desirable to have more than ten to twenty percent of water in the acid passing out of that part of the column which has present the withdrawing agent; and this maximum amount of water which can be satisfactorily separated by straight rectification in the lower part of the column without the aid of withdrawing agent depends on the water present in the dilute acid fed to the column, and also on the latent heat and azeotropic ratio of the withdrawing agent used.

It is well known that if less than 25% water is present in acetic acid, it may be separated from most of the acid without the expenditure of an excessive amount of heat by ordinary rectification. The water so removed will contain considerable acid; in the usual case, about an equal amount. The heat requirements are excessive, however when dilute acids are submitted to ordinary rectification, and especially is this the case when it is desired to remove all of the water substantially free of acid.

I have discovered now, that by using the lower part of an efficient column in continuous operation for ordinary rectification of the last water from the acetic acid, the vapors, containing all of the water and considerable acid, may be passed into the upper part of the column wherein the water is completely separated in an azeotropic distillation; and the acid is allowed to flow back into that part of the column wherein ordinary rectification is proceeding. The liquid flowing from the upper part of the column to the lower, commonly called "reflux wash" is used in this rectification just as that returned from a dephlegmator would be if this rectification were proceeding in a separate column. Actually, the lower part is fractionating from the anhydrous acetic acid which is discharged in the usual way from the column base, eighty or ninety per cent acid (for example) which is passed as vapors across the hypothetical division into that part of the column where the withdrawing agent persists and removes the water from the acid in substantially the usual azeotropic distillation. There is used in the lower part of the column to remove the final amount of water from acid by straight rectification the same vaporous heat as is used in the upper part of the column to complete the separation by distillation with the withdrawing agent. This process is the exact reversal of the former method of azeotropic distillation using comparatively low boiling materials such as ethylene dichloride (see U. S. Patent No. 1,917,391) wherein the upper part of the column accomplishes the azeotropic distillation and the lower part of the column is used for a straight rectification of an excess of withdrawing agent rather than an excess of water as in the present invention. In the use of these lower boiling withdrawing agents I have found that sometimes it is advantageous to work with insufficient azeotropic liquid in the lower part of the column.

I have found however, that the use of the lower part of the column for straight rectification of water from acetic acid in a two component system enables the use as withdrawing agents of liquids which boil closely to the boiling point of acetic acid, or indeed at the same temperature or above. Such liquids are even more difficultly separated from acetic acid by straight rectification than the water itself, and in the older processes were considered quite impossible of utilization. It is from these liquids that the most efficient azeotropic withdrawing liquids may be chosen; and I have found that much smaller amounts of liquids having these comparatively high boiling points are required to bring over a unit amount of water than will be required of those having lower boiling points. This means that the column will have less vapors to handle and hence a smaller column can be used; and since less vaporous heat is required, a corresponding reduction in the amount of steam used will also be possible.

By reference to the drawing, the differences in operation of a column when using butyl aceate, one of my preferred materials, and other representative entrainers of the past art will be made apparent.

The early use of entrainers—Maude for benzene, U. S. Patent No. 1,722,532, the Doctor Wacker Gesellschaft for butyl acetate, Brit. Patent No. 298,137, and others—was based on batch operation of the distillation system. To a solution of acetic acid and water in a still pot, the entrainer was added; the entrainer and water were distilled off together and the dry acid remained after being separated from any excess entrainer which might be present. A modification in an early process using ethylene dichloride (U. S. P. 1,804,745) operated continuously, and separated the excess ethylene dichloride from the dry acid in a separate distilling system. Then these two distilling columns were combined as in Othmer U. S. Patent 1,917,391.

Figure 1 shows substantially the operation of a distilling column according to the method of Othmer Patent 1,917,391. The relative widths of the constituents of the bands of vapor and liquid are made approximately proportional to the relative number of moles of each liquid which is present at the given point of the distilling system. While not rigorously exact, these bands serve to show the separations taking place in the respective points of the column and the levels of partial or complete disappearance of the respective components. By using relative moles rather than relative weights, the amounts of vapor are directly comparable in the several figures; and each of the figures is drawn to use the same strength feed—equal moles each of acetic and water—and with the same total volume of vapor. In this way the relative capacity of the same distilling system when using different entrainers is immediately apparent. The entrainers are in each case assumed to be completely insoluble in acetic acid, the molal latent heats are assumed equivalent, reflux and feed liquid are assumed to be at the respective temperatures of the column at their points of introduction, and other minor assumptions customarily made in distilling calculations are used. These assumptions are without prejudice to any of the several entrainers compared.

Referring to Figure 1, it is seen that dilute acid is introduced into a midpoint of the column, the water is completely evaporated therefrom within a relatively few plates below the feed point because of the apparent lowering of its boiling point by the excess of ethylene dichloride present. Patent 1,917,391 describes the action below the feed plate exactly: "the proportion of water to ethylene chloride very markedly decreases until at the lower plates of the column, nothing but ethylene chloride and acetic acid exist upon each plate. As we proceed downwardly through the lower plates of the column, we will find that the ratio of ethylene chloride to acetic acid decreases until at a lowermost plate of the column it will be found that substantially pure acetic acid exists. It will therefore be observed that this lower portion of the column 1 is made to perform the same functions as the additional or supplemental column required in most processes of this general type."

It will be seen from Figure 1 that the water disappears at a considerably higher point than the entrainer, as called for by this conception of the operation of the azeotropic system. (One minor point, not shown in the several figures, is the small addition to the reflux or liquid band due to a slight condensation of water in the upper part of the column. This very narrow band is hard to determine, would be practically the same in every case, and disappears lower down with no net change in either heat consumption or operation.)

In Figure 2, the system is again regarded as continuous in operation (i. e. no change in temperatures or concentrations at any given point at any time). A somewhat smaller amount of entrainer (propyl acetate) is added at the initial charging than before with ethylene dichloride so that the operation is conducted with just the right amount to form the azeotropic mixture with water at every point in the system. This means that at the lowest level where water remains there is just enough entrainer to remove that water and at the next lowest plate both water and entrainer have, for practical purposes, disappeared.

Figure 2:
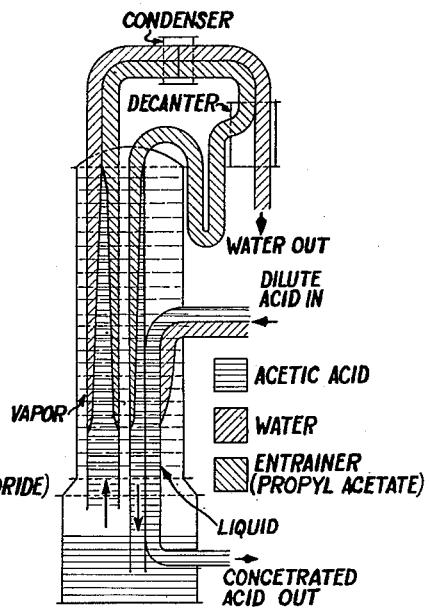
Fig. 2 is a sectional elevation schematically showing the flow in a column of dilute acetic acid, propyl acetate entrainer and the extracted water.

The disappearance of water and entrainer at the same level in descending the column is graphically shown in Figure 2; and is specified as the correct procedure in application Serial No. 513,989, now Patent No. 2,028,800 dated Jan. 28, 1936. This application states that the operation "should be so controlled that there will be no excess of withdrawing agent, and that at the point in the column at which the last of the water disappears, the last of the withdrawing agent will also disappear."

Figure 3:
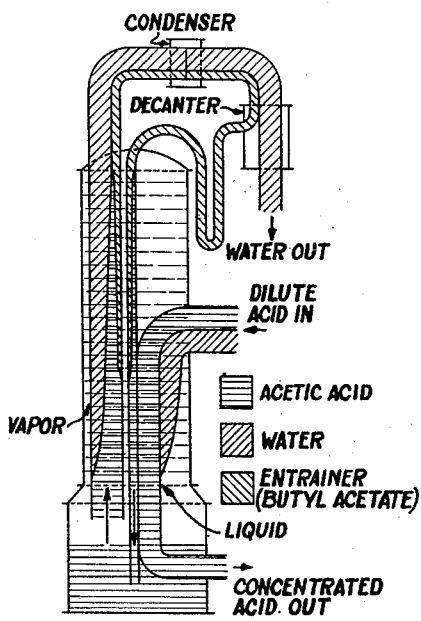
Fig. 3 is a sectional elevation schematically showing the flow in a column of dilute acetic acid, butyl acetate entrainer and the extracted water.

Figure 3 diagrams the method of operating while using my preferred process with butyl acetate. In this case, a much smaller amount of entrainer is charged into the system so there is much less than sufficient to form an azeotropic mixture with all of the water in the lower part of the column. Butyl acetate forms with water the characteristic azeotropic mixture in the upper part of the column, the rectifying process effectually separating the acetic acid from this azeotropic mixture before the mixture is discharged from the head of the column to the condenser. The butyl acetate after being separated from the water in the decanter is returned to the head of the column as reflux wash. Because of its lower boiling point in the presence of water than the acetic acid, it is gradually re-evaporated in passing down the column, due to the condensation of the acetic acid in the regular process of rectification. The amount of butyl acetate in the reflux stream gradually diminishes as indicated until at some level, the last of the liquid butyl acetate dissolved in acetic acid and water disappears. This point is usually below the feed entrance, as shown, although not necessarily so. It is, however, above the point of disappearance of the last of the water. The reflux liquid stream after losing the last of the butyl acetate which had been dissolved therein contains water and acetic acid. These two liquids are separated in the lower part of the column by straight rectification, until at one of the lowermost plates substantially the last of the water is removed and dry acetic acid is discharged from the column to the pot.

Figure 4:
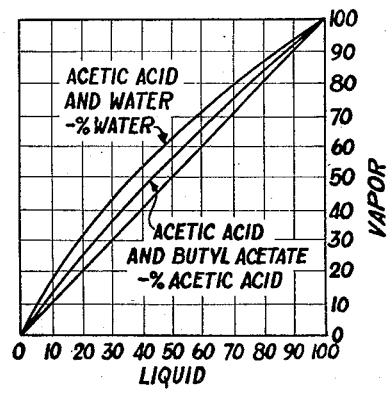
Fig. 4 is a chart showing the vapor composition curves of acetic acid and water and of acetic acid and butyl acetate.

Figure 4 represents the vapor composition curves of acetic acid and water, and of acetic acid and butyl acetate. These indicate the relative difficulty of separating the components of these two mixtures; and show the practical impossibility of removing any excess butyl acetate in case it should be allowed to get below the last of the water, and thence into the dry acid.

In the absence of water, butyl acetate has a higher boiling point than acetic acid and would tend to concentrate in the still pot. This would accentuate this difficulty. The operation with an insufficient amount of entrainer in the column to get to the lower levels allows the separation to be made without difficulty.

In all three processes control is maintained by observation of thermometers at several points in the column.

Each of the first three figures represents the operation of the same column with the same strength of feed. The relative capacities of the column under these conditions is indicated by widths of the feed bands and also by the widths of the bands representing the amount of concentrated acid withdrawn. The numerical ratio of capacities is as follows: using the first as unity

| Ethylene dichloride | Propyl acetate | Butyl acetate |
|---|---|---|
| 1 | 1.45 | 2.1 |

The comparative heat costs per pound of acid produced are roughly indicated by these same bands since molecular heats of vaporization are approximately equal. The following table does not include this assumption and indicates the numerical ratios in heat costs:

| Entrainer used | Ethylene dichloride | Propyl acetate | Butyl acetate |
|---|---|---|---|
| Pounds entrainer per pound water in azeotropic mixture | 11.3 | 6.3 | 2.57 |
| Azeotropic temperature °F | 158 | 179 | 195 |
| Latent heat entrainer per pound | 139.3 | 144.5 | 132.8 |
| Latent heat entrainer per pound water removed | B.t.u. 1,574 | B.t.u. 911 | B.t.u. 341 |
| Latent heat water plus entrainer per pound water | B.t.u 2,576 | B.t.u. 1,901 | B.t.u. 1,319 |
| Pounds steam per pound water removed | B.t.u. 2.66 | B.t.u. 1.96 | B.t.u. 1.36 |
| Pounds steam per pound acetic from 6¼% solution | 39.9 | 29.4 | 20.4 |

By the proper operation of this continuous process, I have found that the number of liquids which may be used for azeotropic withdrawing agents has been greatly extended. In general, the use of less than the required amount extends the boiling range of suitable azeotropic liquids from 102° C., which was formerly regarded as the upper limit for continuous operation to about 150° C. Many liquids in this boiling range have been found satisfactory and those listed below are to be regarded merely as examples of those which may be used when the lower part of the column is allowed to separate the acetic acid from the last of the water by straight rectification and the upper part substantially separates the water from the acetic acid by the azeotropic distillation.

Among the liquids which may be used are the following, with their normal boiling points—
Allyl acetate 105° C.; amyl chloride 106; dichloromethyl ether 106; butyl formate 107; ethyl iso amyl ether 112; iso butyl acetate 118; allyl iso amyl ether 120; ethyl amyl ether 120; chloroacetone 121; dibutyl ether (sec) 121; ethyl butyrate 121; dibutyl ether (iso) 123; propyl propionate 123; iso-amyl formate 124; ethyl propyl ketone 124; butyl acetate 127; methyl butyl ketone 127; allyl acetone 129; crotonyl acetate 129; mesityl oxide 129; amyl formate 130; butyl propionate 137; dibutyl ether 141; iso amyl acetate 142; propyl butyrate 143; dipropyl ketone 144; amyl acetate 148.

Certain of the liquids are more efficient from the standpoint of heat costs, others may be more efficient from the standpoint of ease of separation of substantially pure water at the still head. In some cases, as, for example, with butyl ether, I have discovered that some acid may, under some conditions, be found in the water at the still head unless an excessively long column is used. This is not always undesirable, but when acid free water is wanted, choice will be made of another material, such as allyl acetate to give this result.

It will be apparent to those skilled in the art that the calculation of the number of bubble cap plates necessary for the lower part of the column can readily be made by setting up the customary heat balances. The maximum amount of reflux wash entering the top of this section may also be obtained by the same calculation. With a known number of plates, and the amount of reflux wash which is available thus calculated, it is simple to determine by the usual methods of design for a column the maximum amount of water which may be allowed in the acid descending from the azeotropic section if glacial acid is to be obtained at the column base. The upper part of the column in which the azeotropic distillation is conducted is simply a continuation of the lower section with no mechanical transition or differences; and it is made of a suitable height to give the required freedom of acid in the water discharged. If this is exceeded in practice, it is merely necessary to charge a small additional amount of withdrawing agent so that it will work down and thus lengthen the section in which the azeotropic distillation is being conducted. A skilled operator will immediately recognize a change of conditions in practice by observation of changes in the temperatures of thermometers inserted along the side of the column, and will readily apply the proper corrections.

I have found that with a bubble plate column of standard design, that from thirty to fifty plates are required, depending to some extent upon the strength of the acid to be concentrated; but to a greater extent on the boiling point and some other physical properties of the withdrawing agent used.

In many cases, the same materials of boiling points up to 150° C., which I have found to be suitable for azeotropic withdrawing agents by the use of the process described, may be used as extracting agents for the separation of the acetic acid from the bulk of the water before distillation. While the use of extracting solvents having boiling points in the upper part of this boiling range is well known, U. S. Patent 1,839,932, it has hitherto been necessary to add still another liquid to perform the azeotropic withdrawal of the water which necessarily accompanies the acetic acid. By the use of the method of azeotropic distillation above described, it is possible to accomplish the extraction first and then the azeotropic distillation with the same material. While all of the materials which are suitable for the azeotropic distillation are not useful for a preliminary extraction step, many such as dibutyl ether are satisfactory for both operations.

I have also found that this process of azeotropic distillation where insufficient withdrawing agent is present in the distillation system to form the azeotropic mixture with the water present in the middle or lower part of the column is useful for removing the water present in mixtures with other fatty acids than acetic, such as formic, propionic, butyric and higher homologues, or any mixture of two, three or more of these acids and water; and that under some conditions, the extraction process using the same withdrawing agent may advantageously precede this azeotropic distillation.

It will be understood by those skilled in the art that many arrangements of standard equipment may be used to carry out the features of my invention, and are within the spirit of my disclosure as limited and defined by the appended claims.

In particular, it may be noted that any standard type of extractor and/or distilling column or columns which are efficient for this purpose may be used; that a single column may be used for both the azeotropic distillation and the straight rectification of water from acid or acids, or that two columns may be used with or without a still pot and heating unit in between. The dilute acid may be fed into the distilling column or columns either in a liquid or vaporous state; and the discharged acid may be either partly or completely dehydrated and passed from the distillation system in either a liquid or vaporous condition. Also, after the azeotropic distillation, the condensate from the condenser may be separated into layers comprising substantially pure water and substantially pure withdrawing agent respectively, and the former discharged to waste or to an auxiliary still for recovering the trace of withdrawing agent dissolved therein, while the latter is returned to the head of the still as reflux wash, or divided into two or more streams one of which enters the top of the distilling column and the rest of which enters the column at a lower point or points. Likewise, it is apparent that in some cases other chemical materials than the withdrawing liquid itself may be added in such a way that the withdrawing liquid will be manufactured in the column; for example, the respective alcohols may be added to form suitable acetates. Also various mixtures of withdrawing liquids may be used in combination, and the action of the combination as defined by the following claims is to be regarded as that of a single material.

Having described my invention, what I claim and desire to secure by Letters Patent is, as follows:—

1. In the process of dehydrating aqueous solutions of one or more of the lower fatty acids, the use of allyl acetate for extracting the acid or acids from the water.

2. The continuous process of dehydrating aqueous solutions of one or more of the lower fatty acids by distillation in the presence of allyl acetate, said allyl acetate acting as a withdrawing agent for the water in which insufficient allyl acetate is present to form an azeotropic mixture with the water at all points in the system.

3. The process of continuously separating water from its solution with one or more of the lower fatty acids, in which the dilute acid or acids is extracted with allyl acetate; the aqueous layer discharged after substantially complete exhaustion; the allyl acetate layer containing substantially all of the acid originally present and part of the water, passed to a column still in which the allyl acetate removes a part or all of the remaining water in an azeotropic distillation so controlled that insufficient allyl acetate is present to form an azeotropic mixture in the lower part of the column and the lower fatty acid or acids discharged in a concentrated condition.

4. The process for separating water from acetic acid by distillation with insufficient allyl acetate to form an azeotropic mixture with the water at all points in the system, in which the water and allyl acetate form an azeotropic mixture in the still head, the vaporous mixture is condensed, the condensate separated into a water and an allyl acetate layer, the water layer discharged and the allyl acetate layer returned to the still head to remove more water, and the process conducted so as to give substantially dry acetic acid in the still pot.

5. In the process of dehydrating aqueous solutions of the lower fatty acids by distillation in a column in the presence of withdrawing agents having normal boiling points between 102° and 150° C. for the removal of water by an azeotropic distillation in the upper part of the distilling column, the use of insufficient withdrawing agent to form an azeotropic mixture with water in the lower part of the distilling column.

6. In the continuous process of dehydrating aqueous solutions of the lower fatty acids by distillation in a column in the presence of withdrawing agents having normal boiling points between 102° and 150° C., for the removal of water in an azeotropic mixture in the upper part of the column, the separation of the last part of the water from the acid or acids by straight rectification.

7. The process for separating water from a lower fatty acid or acids by distillation with a withdrawing agent having a normal boiling point between 102° and 150° C. in which the water and said withdrawing agent form an azeotropic mixture in the still head, the vaporous mixture is condensed, the condensate separated into a water and a withdrawing liquid layer, the water layer discharged and the withdrawing liquid layer returned to the still head to remove more water, the partially concentrated lower fatty acid or acids passed out of the upper part of the distilling column containing withdrawing liquid to a lower part which contains no withdrawing liquid, additional water separated by straight rectification from lower fatty acid or acids in the lower part of the column, the highly concentrated lower fatty acid or acids removed from the column base, and a vaporous mixture, containing most of the water and some of the acid or acids in said partially concentrated lower fatty acid or acids passing to said lower part, passed upwardly from said lower part of the distilling column to said upper part.

8. The process for separating water from acetic acid by distillation with a withdrawing agent having a normal boiling point between 102° and 150° C. in which the water and said withdrawing agent form an azeotropic mixture in the still head, the vaporous mixture is condensed, the condensate separated into a water and a withdrawing liquid layer, the water layer discharged and the withdrawing liquid layer returned to the still head to remove more water, the partially concentrated acetic acid passed out of the upper part of the distilling column containing withdrawing liquid to a lower part which contains no withdrawing liquid, additional water separated by rectification in a two component system from acetic acid in the lower part of the column, the anhydrous acetic acid removed from the column base, and the two component vaporous mixture containing substantially all of the water and some of the acetic acid in said partially concentrated acetic acid passing to said lower part, passed upwardly from said lower part of the distilling column to said upper part.

9. In the process of dehydrating aqueous solutions of the lower fatty acids by distillation in the presence of allyl acetate for the removal of water by an azeotropic distillation in the upper part of the distilling column, the use of insufficient allyl acetate to form an azeotropic mixture with water in the lower part of the distilling column.

10. In the continuous process of dehydrating aqueous solutions of the lower fatty acids by distillation in the presence of allyl acetate for the removal of water by an azeotropic distillation in the upper part of the distilling column, the separation of the last part of the water from the acetic acid by straight rectification.

11. The process for separating water from a lower fatty acid or acids by distillation with allyl acetate in which the water and said allyl acetate form an azeotropic mixture in the still head, the vaporous mixture is condensed, the condensate separated into a water and a withdrawing liquid layer, the water layer discharged and the withdrawing liquid layer returned to the still head to remove more water, the partially concentrated lower fatty acid or acids passed out of the upper part of the distilling column containing withdrawing liquid to a lower part which contains no withdrawing liquid, additional water separated by straight rectification from lower fatty acid or acids in the lower part of the column, the highly concentrated lower fatty acid or acids removed from the column base, and a vaporous mixture containing most of the water and some of the acid or acids in said partially concentrated lower fatty acid or acids passing to said lower part, passed upwardly from said lower part of the distilling column to said upper part.

12. The process for separating water from acetic acid by distillation with allyl acetate in which the water and said allyl acetate form an azeotropic mixture in the still head, the vaporous mixture is condensed, the condensate separated into a water and a withdrawing liquid layer, the water layer discharged and the withdrawing liquid layer returned to the still head to remove more water, the partially concentrated acetic acid passed out of the upper part of the distilling column containing withdrawing liquid to a lower part which contains no withdrawing liquid, additional water separated by rectification in a two component system from acetic acid in the lower part of the column, the anhydrous acetic acid removed from the column base, and the two component vaporous mixture containing most of the water and some of the acetic acid in said partially concentrated acetic acid passing to said lower part, passed upwardly from said lower part of the distilling column to said upper part.

13. The continuous process of dehydrating aqueous solutions of one or more of the lower fatty acids by distillation in the presence of butyl acetate, said butyl acetate acting as a withdrawing agent for the water, in which insufficient butyl acetate is present to form an azeotropic mixture with the water at all points in the system.

14. The process of continuously separating water from its solution with one or more of the lower fatty acids, in which the dilute acid or acids is extracted with butyl acetate, the aqueous layer discharged after substantially complete exhaustion, the butyl acetate layer containing substantially all of the acid originally present and part of the water, passed to a column still in which the butyl acetate removes a part or all of the remaining water in an azeotropic distillation so controlled that insufficient butyl acetate is present to form an azeotropic mixture in the lower part of the column and the lower fatty acid or acids discharged in a concentrated condition.

15. The process for separating water from acetic acid by distillation with insufficient butyl acetate to form an azeotropic mixture with the water at all points in the system, in which the water and butyl acetate form an azeotropic mixture in the still head, the vaporous mixture is condensed, the condensate separated into a water and a butyl acetate layer, the water layer discharged and the butyl acetate layer returned to the still head to remove more water, and the process conducted so as to give substantially dry acetic acid in the still pot.

16. In the process of dehydrating aqueous solutions of the lower fatty acids by distillation in the presence of butyl acetate for the removal of water by an azeotropic distillation in the upper part of the distilling column, the use of insufficient butyl acetate to form an azeotropic mixture with water in the lower part of the distilling column.

17. In the continuous process of dehydrating aqueous solutions of the lower fatty acids by distillation in the presence of butyl acetate for the removal of water by an azeotropic distillation in the upper part of the distilling column, the separation of the last part of the water from the lower fatty acids by straight rectification.

18. The process for separating water from a lower fatty acid or acids by distillation with butyl acetate in which the water and said butyl acetate form an azeotropic mixture in the still head, the vaporous mixture is condensed, the condensate separated into a water and a withdrawing liquid layer, the water layer discharged and the withdrawing liquid layer returned to the still head to remove more water, the partially concentrated lower fatty acid or acids passed out of the upper part of the distilling column containing withdrawing liquid to a lower part which contains no withdrawing liquid, additional water separated by straight rectification from lower fatty acid or acids in the lower part of the column, the highly concentrated lower fatty acid or acids removed from the column base, and a vaporous mixture containing most of the water and some of the acid or acids in said partially concentrated lower fatty acid or acids passing to said lower part passed upwardly from said lower part of the distilling column to said upper part.

19. The process for separating water from acetic acid by distillation with butyl acetate in which the water and said butyl acetate form an azeotropic mixture in the still head, the vaporous mixture is condensed, the condensate separated into a water and a withdrawing liquid layer, the water layer discharged and the withdrawing liquid layer returned to the still head to remove more water, the partially concentrated acetic acid passed out of the upper part of the distilling column containing withdrawing liquid to a lower part which contains no withdrawing liquid, additional water separated by rectification in a two component system from acetic acid in the lower part of the column, the anhydrous acetic acid removed from the column base, and the two component vaporous mixture containing most of the water and some of the acetic acid in said partially concentrated acetic acid passing to said lower part, passed upwardly from said lower part of the distilling column to said upper part.

20. A continuous process for dehydrating aqueous solutions of one or more of the lower fatty acids by distillation in the presence of an ester of an alcohol and an organic acid having a boiling point between about 105° C. and about 148° C., said ester acting as a withdrawing agent for the water, in which an insufficient quantity of said ester is present to form an azeotropic mixture with the water at all points in the system.

21. A continuous process for dehydrating aqueous solutions of one or more of the lower fatty acids by distillation in the presence of amyl acetate, said amyl acetate acting as a withdrawing agent for the water, in which insufficient amyl acetate is present to form an azeotropic mixture with the water at all points in the system.

22. In the continuous process of dehydrating aqueous solutions of the lower fatty acids by distillation in a distillation column in the presence of amyl acetate for the removal of water by an azeotropic distillation in the upper part of the distilling column, separation of the last part of the water from the lower fatty acids by straight rectification.

DONALD F. OTHMER.